United States Patent [19]

Maebayashi et al.

[11] Patent Number: 5,287,942
[45] Date of Patent: Feb. 22, 1994

[54] VEHICLE POWER TRAIN STRUCTURE

[75] Inventors: Jiro Maebayashi; Isao Tohda, both of Yokohama, Japan

[73] Assignee: Mazda Motor Corporation, Hiroshima, Japan

[21] Appl. No.: 979,311

[22] Filed: Nov. 20, 1992

[30] Foreign Application Priority Data

Nov. 20, 1991 [JP] Japan .................................. 3-304373

[51] Int. Cl.$^5$ ................................................ B60K 5/04
[52] U.S. Cl. .................................... 180/297; 123/57 R
[58] Field of Search ............... 123/55 VS, 57 R, 59 R; 180/54.1, 291, 297

[56] References Cited

U.S. PATENT DOCUMENTS

| | | | |
|---|---|---|---|
| 2,782,864 | 2/1957 | Fessia | 180/297 X |
| 4,412,515 | 11/1983 | Fritzenwenger | 123/198 E |
| 4,446,828 | 5/1984 | Bauder et al. | 123/196 R |
| 4,716,984 | 1/1988 | Hiramatsu et al. | 180/297 |
| 5,129,476 | 7/1992 | Kikuchi et al. | 180/297 X |

FOREIGN PATENT DOCUMENTS 399502  11/1990  European Pat. Off. ............ 180/297

3838073A1 5/1990 Fed. Rep. of Germany .

Primary Examiner—David M. Mitchell
Assistant Examiner—Michael Mar

[57] ABSTRACT

This invention has as its object to provide a vehicle power train structure, which can decrease the total height and the total length of the entire power train as a combination of an engine, a transmission, a drive shaft, and the like. In order to achieve this object, a power train structure according to this embodiment includes an engine which has a plurality of cylinders arranged in series with each other, and is mounted in a vehicle body with a bore center axis of the cylinder inclining downwardly towards a cylinder head of said cylinder with respect to horizontal plane of the vehicle, such that a crankshaft as an output shaft extends in the widthwise direction of the vehicle body, a transmission, arranged at a position neighboring the engine to be substantially parallel to the extending direction of the crankshaft, for receiving a rotating force of the engine, and a drive shaft, arranged behind the transmission to extend in the widthwise direction of the vehicle body, for receiving the rotating force of the engine from the transmission.

8 Claims, 6 Drawing Sheets

|  | FIRST EMBODIMENT | BASE |
|---|---|---|
| FOH | 575(-245) | 820 |
| WB | 2560(+60) | 2500 |
| TOTAL LENGTH | 3915(-185) | 4100 |

|  | SECOND EMBODIMENT | BASE |
|---|---|---|
| FOH | 820(±0) | 820 |
| WB | 2415(-85) | 2500 |
| TOTAL LENGTH | 4015(-85) | 4100 |

|  | THIRD EMBODIMENT | BASE |
|---|---|---|
| FOH | 705(-115) | 820 |
| WB | 2500(±0) | 2500 |
| TOTAL LENGTH | 3985(-115) | 3985 |

VEHICLE POWER TRAIN STRUCTURE

BACKGROUND OF THE INVENTION

The present invention relates to a power train or plant structure of a vehicle, which has an engine mounted in a vehicle body with a bore center axis of the cylinder inclining downwardly towards a cylinder head with respect to horizontal plane of the vehicle.

In a front-wheel drive vehicle or a four-wheel drive vehicle in which an engine is transversely mounted in the front portion of a vehicle body, a transmission is normally transversely mounted with respect to the vehicle body to be adjacent to the engine. A drive shaft (axle) for front wheels is mounted to extend parallel to the transmission in the back-and-forth direction or the up-and-down direction of the vehicle body, and the rotating force of the engine is transmitted to the drive shaft through the transmission.

However, in the above-mentioned prior art, the transmission is mounted to extend parallel to a crankshaft of the engine, and an angle defined between the central axis of each cylinder of the engine and a line connecting the center of rotation of the crankshaft and the center of the transmission is set to be 90° or less so as to prevent interference between a cylinder block and the transmission. The crankshaft of the engine is normally located at the lowermost position of the engine. For this reason, when the engine is mounted, so that the bore center axis of each cylinder is perpendicular to the ground, the center of the transmission is located at substantially the same level as that of the bore center axis of the crankshaft or higher. More specifically, the transmission is located at a considerably low level with respect to the engine and the vehicle body. Even when the engine is slanted, the slant angle is as small as about 35° to 45°. For this reason, it is impossible to shift the transmission to a position considerably higher than the crankshaft. The drive shaft for the front wheels is mounted below the transmission or is mounted to extend parallel to the transmission in the back-and-forth direction of the vehicle body.

Of the above-mentioned arrangements, when the drive shaft is mounted below the transmission like in the former arrangement, the position of the drive shaft is further shifted below the transmission which is originally mounted at a low level. Therefore, the total height of a power train as a combination of the engine,, the transmission, and the drive shaft is increased, resulting in a high engine-hood line.

When the drive shaft for the front wheels is mounted to extend parallel to the transmission in the back-and-forth direction of the vehicle body as in the latter arrangement, since the crankshaft, the transmission, and the drive shaft are juxtaposed in the back-and-forth direction of the vehicle body, they are arranged to extend in the back-and-forth direction, resulting in an increase in back-and-forth length of the power train.

SUMMARY OF THE INVENTION

The present invention has been made in consideration of the above situation, and has as its object to provide a vehicle power train structure, which can decrease the vertical height of the entire power train as a combination of an engine, a transmission, a drive shaft, and the like.

It is another object of the present invention to provide a vehicle power train structure, which can decrease the back-and-forth length of the entire power train as a combination of an engine, a transmission, a drive shaft, and the like.

In order to achieve the above objects, a vehicle power train structure for a vehicle according to the first aspect of the present invention is characterized by the following arrangement.

More specifically, a vehicle power train structure comprises an engine which has a plurality of cylinders arranged in series with each other, and is mounted in a vehicle body with a bore center axis of the cylinder inclining downwardly toward a cylinder head of the cylinder with respect to horizontal plane of the vehicle, such that a crankshaft as an output shaft extends in a widthwise direction of the vehicle body, a transmission, arranged at a position neighboring the engine to be substantially parallel to an extending direction of the crankshaft, for receiving a rotating force of the engine, and a drive shaft, arranged below the transmission to extend in the widthwise direction of the vehicle body, for receiving the rotating force of the engine from the transmission.

A vehicle power train structure according to the second aspect of the present invention is characterized by the following arrangement.

More specifically, a vehicle power train structure comprises an engine which has a plurality of cylinders arranged in a V shape, and is mounted in a front portion of a vehicle body with a bore center axis of the cylinder inclining downwardly towards a cylinder head of the cylinder with respect to horizontal plane of the vehicle, such that a crankshaft as an output shaft extends along a widthwise direction of the vehicle body, a plurality of exhaust manifolds respectively connected to the plurality of cylinder heads to extend inside a banking angle of the V shape, a plurality of intake manifolds respectively connected to the plurality of cylinder heads to extend outside the banking angle of the V shape, and a collecting portion of the intake manifolds, arranged above the engine.

A vehicle power train structure according to the third aspect of the present invention is characterized by the following arrangement.

More specifically, a vehicle power train structure comprises an engine which has a plurality of cylinders arranged in a V shape, and is mounted in a front portion of a vehicle body with a bore center axis of the cylinder inclining downwardly towards a cylinder head of the cylinder with respect to horizontal plane of the vehicle, such that a crankshaft as an output shaft extends along a widthwise direction of the vehicle body, and a drive shaft, arranged at a middle position between a banking angle of the V shape, and coupled to front wheels.

Since the vehicle power train structure according to the present invention is arranged, as described above, the crankshaft can be located at an upper position with respect to a vehicle body by transversely mounting the engine with a bore center axis of the cylinder inclining downwardly towards a cylinder head with respect to horizontal plane of the vehicle, and the level of the transmission can be increased to a position near the level of the crankshaft. For this reason, the drive shaft for front wheels can be arranged below the transmission, and the total height of the power train as a combination of these components can be decreased. Since the drive shaft for the front wheels can be arranged below the transmission, the power train can be prevented from being prolonged in the back-and-forth direction of the vehicle body.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Figure 1:
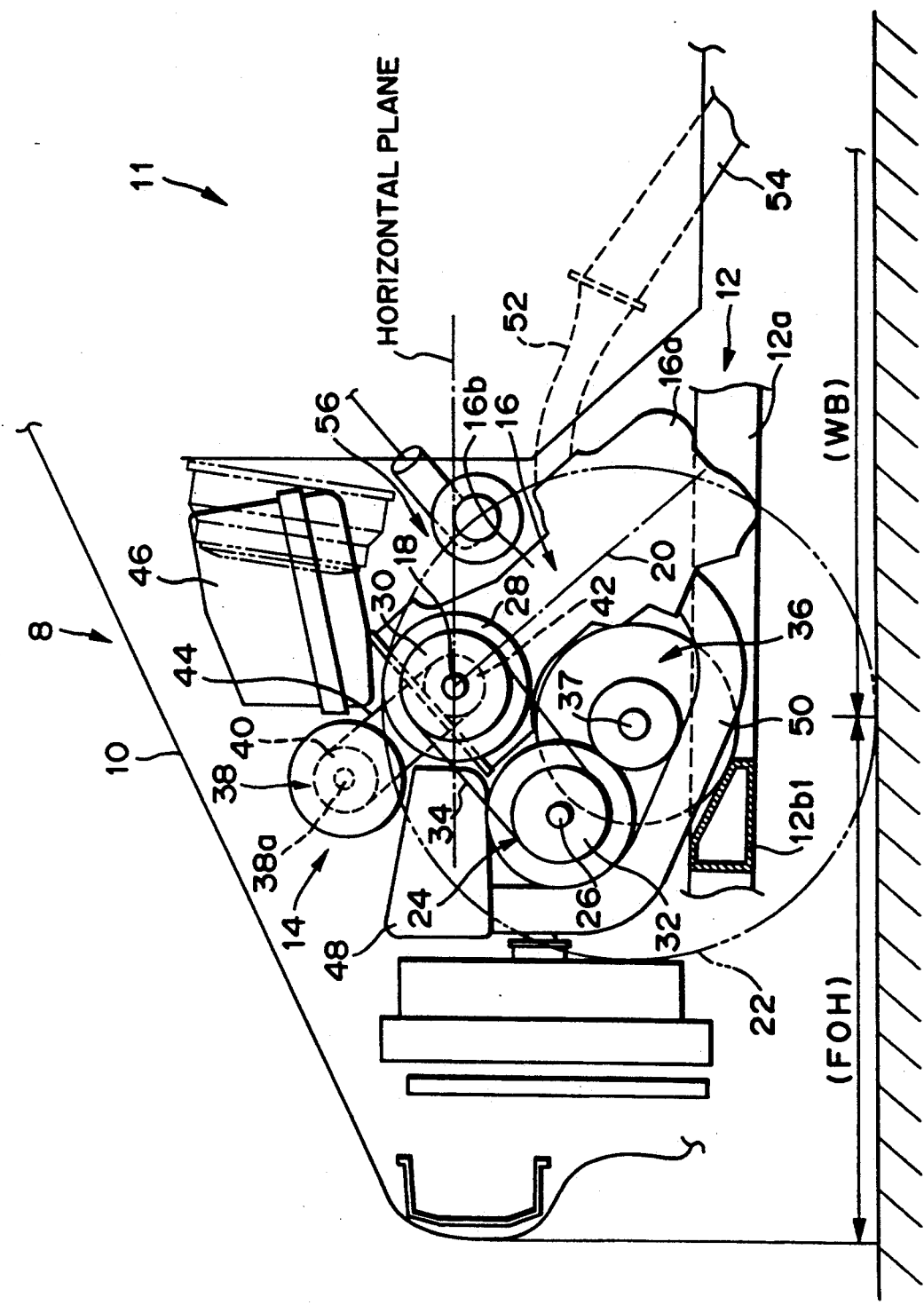
FIG. 1 is a side sectional view showing a vehicle power train structure according to the first embodiment of the present invention.

The preferred embodiments of the present invention will be described in detail hereinafter with reference to the accompanying drawings. FIG. 1 is a side sectional view showing an engine room in a front portion of a vehicle, i.e., showing a power train structure of the first embodiment.

Referring to FIG. 1, a body 10 constituting an upper portion of a vehicle body 8 is supported on a frame 12 constituting a lower portion of the vehicle body 8. The frame 12 is a ladder frame, which is constituted by extending a plurality of beam-like cross members 12b (FIG. 1 illustrates only a member 12b1) along the widthwise direction of the vehicle body between two beam-like side members 12a extending in the back-and-forth direction of the vehicle body. A power train 14 is supported on the cross member 12b1, located at the most front side of the vehicle body, of these cross members 12b.

The arrangement of the respective portions of the power train 14 will be described below.

An engine 16 is an in-line type four-cylinder engine, and is mounted on the frame 12 with a bore center axis 20 of each cylinder inclining downwardly towards a cylinder head 16a with respect to horizontal plane of the vehicle, i.e., such that a crankshaft 18 as the output shaft of the engine 16 is located at an upper position, as shown in FIG. 1. A bore center axis 20 of each cylinder is inclined forward at about 45° to have the cylinder head 16a side located at a lower position as a fulcrum. Therefore, the cylinder head 16a is located at a lower position of the rear side of the vehicle body 8, and the crankshaft 18 is located at an upper position of the front side of the vehicle body 8. Note that the position of the center of gravity of the engine 16 is located behind front wheels 22, thus realizing a so-called front-midship mount.

A transmission 24 is mounted on a line crossing the central axis of the crankshaft 18 of the engine 16, and extending in a direction perpendicular to the bore center axis 20 of each cylinder, such that its input shaft 26 is located on this line. A clutch 28 is attached to the crankshaft 18, and an output gear 30 is attached coaxially with the crankshaft 18 through the clutch 28. A silent chain 34 is looped between an input gear 32 attached to the input shaft 26 of the transmission 24 and the output gear 30, and the rotating force of the crankshaft 18 is transmitted to the transmission 24 through the silent chain 34.

A front differential device 36 is arranged obliquely below the transmission 24, and the rotating force transmitted from the transmission 24 is transmitted to the right and left front wheels 22 via the front differential device 36 and a front drive shaft 37 in turn.

A series auxiliary unit 38 prepared by coupling a plurality of auxiliary devices in series with each other is arranged on substantially the extending line of the bore center axis 20 of each cylinder, and a driven pulley 40 is attached to the end portion of a driving shaft 38a of the series auxiliary unit 38. A driving pulley 42 is attached to the end portion of the crankshaft 18, opposite to the end portion attached with the clutch 28, and a belt 44 is looped between the driving pulley 42 and the driven pulley 40. The series auxiliary unit 38 is driven and operated by these two pulleys 40 and 42 and the belt 44 upon rotation of the crankshaft 18.

An air cleaner 46 is mounted above the engine 16. Fresh air filtered through the air cleaner 46 is supplied to a serge tank 48 mounted obliquely above the engine 16 through an intake pipe (not shown). One end portion of an intake manifold 50 for supplying fresh air to the cylinders of the engine 16 is connected to the serge tank 48, and the other end portion of the intake manifold 50 is connected to the front-side portion of the cylinder head 16a of the engine 16. Fresh air supplied from the air cleaner 46 to the serge tank 48 is supplied to the cylinder head 16a through the intake manifold 50. With this arrangement, the intake manifold 50 is assured with a sufficient length between the serge tank 48 and the cylinder head 16a so as to attain inertial aspiration, as shown in FIG. 1.

An exhaust manifold 52 is connected to the rear-side portion of the cylinder head 16a. An exhaust pipe 54 connected to the exhaust manifold 52 extends to the rear portion of the vehicle body 8.

A rack-and-pinion type steering gear box 56 is arranged at a position corresponding to a constricted portion 16b of a cylinder block of the engine 16, so that the steering gear box 56 is prevented from entering a passenger room 11 by utilizing the space corresponding to the constricted portion 16b.

Figures 2, 3:
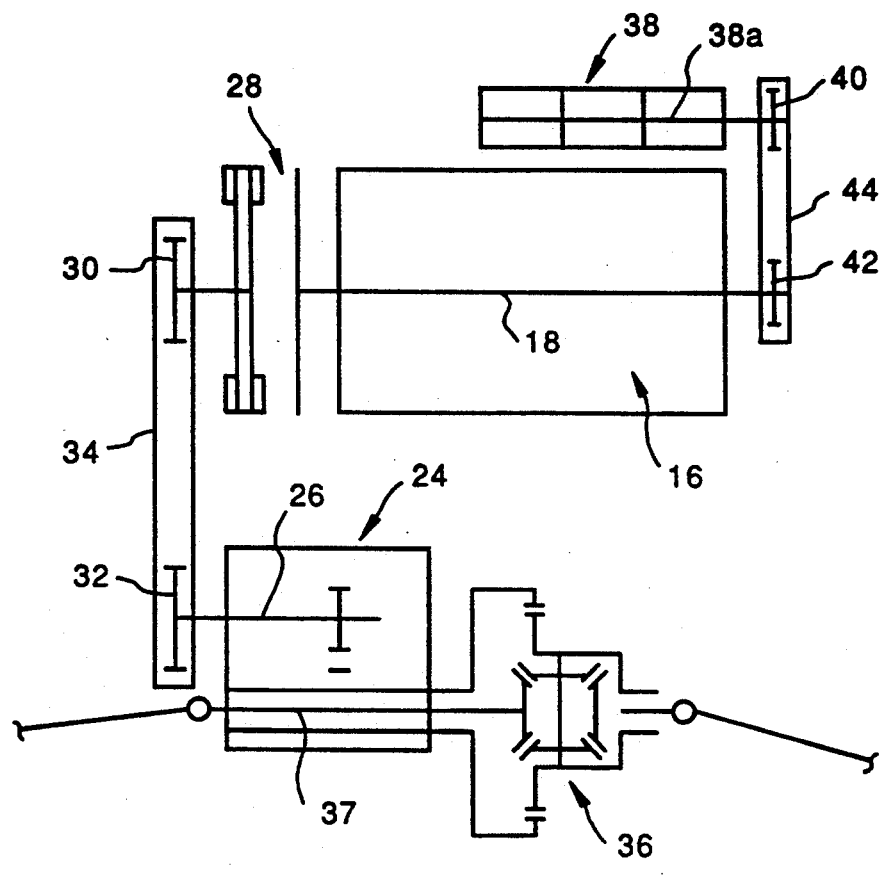
FIG. 2 is a plan view showing the vehicle power train structure of the first embodiment.
FIG. 3 is a table showing changes in dimensions of a vehicle body adopting the vehicle power train structure of the first embodiment with respect to a base vehicle body.

FIG. 2 is a plan view illustrating the arrangement of the power train 14.

As described above, the output gear 30 is attached to one end portion of the crankshaft 18 of the engine 16 through the clutch 28. The transmission 24 is mounted at a position neighboring the engine 16, and the silent chain 34 is looped between the input gear 32 of the transmission 24 and the output gear 30 of the engine 16 side, thereby transmitting the rotating force of the engine 16 to the transmission 24. The rotating force of the engine 16 transmitted to the transmission 24 is transmitted to the front drive shaft 37 through the front differential device 36, and is then transmitted to the right and left front wheels 22.

The belt 44 is looped between the driving pulley 42 attached to the opposing end portion of the crankshaft 18 and the driven pulley 40 of the series auxiliary unit 38, and the series auxiliary unit 38 is driven upon rotation of the crankshaft 18.

FIG. 3 is a table showing changes in dimensions of the respective portions of the vehicle body when the power train structure of the first embodiment is applied to a base vehicle with a cylinder head facing up.

As shown in FIG. 3, although the wheel base (WB) is prolonged by 60 mm with respect to the base vehicle, the front overhung can be shortened by 245 mm, and the total length can also be shortened by 185 nun. Therefore, the vehicle can be rendered compact as compared to the base vehicle while mounting an engine 16 having equivalent performance. Since the total height of the power train 14 can be decreased, the engine hood line can be lowered.

Figure 4:
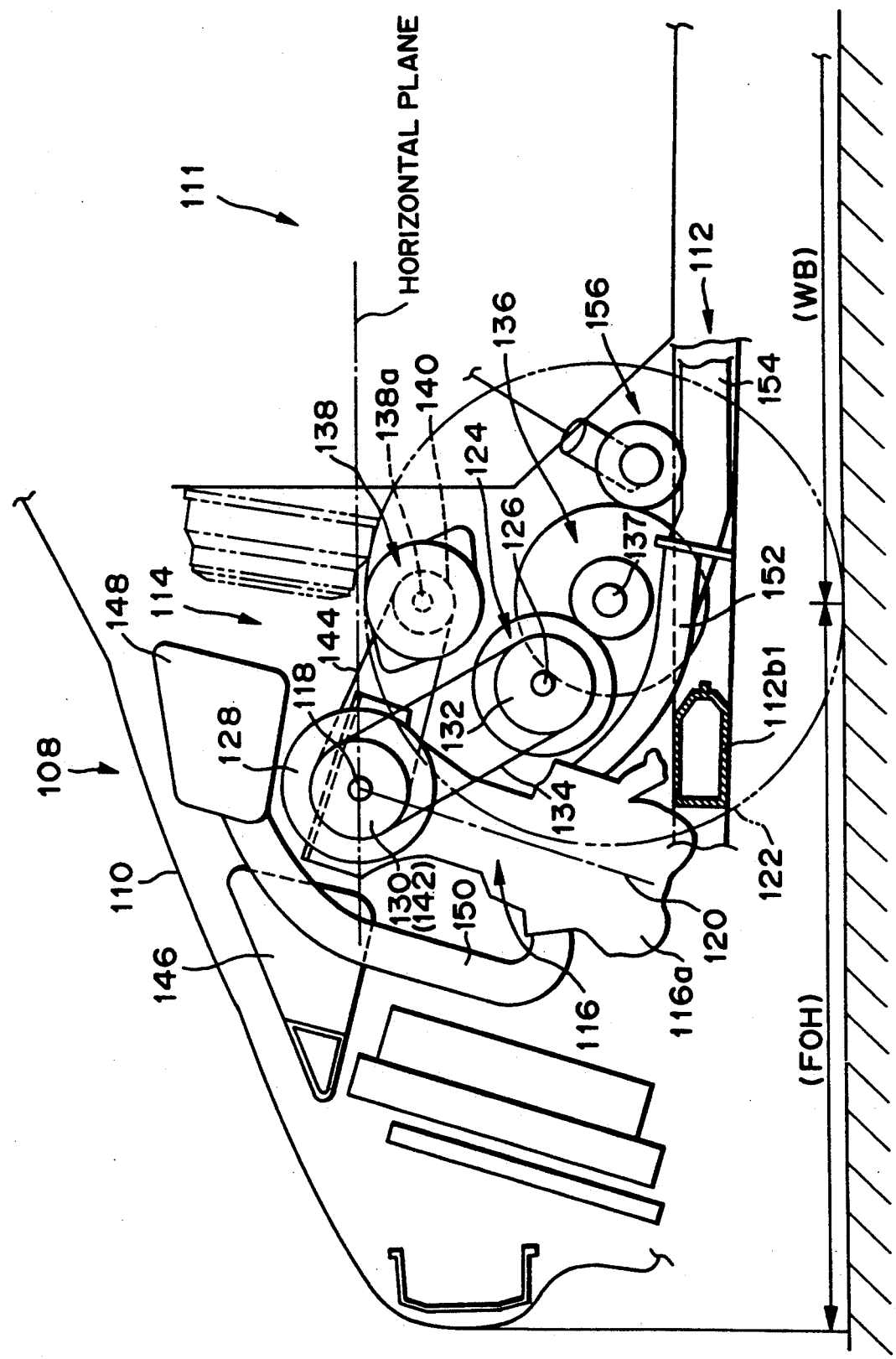
FIG. 4 is a side sectional view showing a vehicle power train structure according to the second embodiment of the present invention.

FIG. 4 is a side sectional view showing a power train structure according to the second embodiment.

Referring to FIG. 4, a body 110 constituting an upper portion of a vehicle body 108 is supported by a ladder frame 112 constituting a lower portion of the vehicle body 108 as in the first embodiment, and a power train 114 is supported on a cross member 112b1, located at the most front side of the vehicle body 108, of the frame 112.

The arrangement of the respective portions of the power train 114 will be described below.

An engine 116 is an in-line type four-cylinder engine, and is mounted on the frame 112 with a bore center axis 120 of each cylinder inclining downwardly towards a cylinder head 116a with respect to horizontal plane of the vehicle, as shown in FIG. 4. A bore center axis 120 of each cylinder is inclined backward at about 30° to have the cylinder head 116a side located at a lower position as a fulcrum. Therefore, the cylinder head 116a is located at a lower position of the front side of the vehicle body 108, and a crankshaft 118 is located at an upper position of the rear portion of the vehicle body 108.

A transmission 124 is mounted on a line passing the center of rotation of the crankshaft 118, and forming an angle of about 50° with the bore center axis 120 of each cylinder, such that the center of its input shaft 126 is located on the line. More specifically, the transmission 124 is mounted obliquely below the rear side of the crankshaft 118. A clutch 128 is attached to the crankshaft 118, and an output gear 130 is attached coaxially with the crankshaft 118 through the clutch 128. A silent chain 134 is looped between an input gear 132 attached to the input shaft 126 of the transmission 124 and the output shaft 130 of the engine 116 side, and the rotating force of the crankshaft 118 is transmitted to the transmission 124 through the silent chain 134.

A front differential device 136 is mounted at a position further obliquely below the rear side of the transmission 124. The rotating force transmitted from the transmission 124 is transmitted to right and left front wheels 122 through the front differential device 136 and a front drive shaft 137 in turn.

A series auxiliary unit 138 prepared by coupling a plurality of auxiliary devices in series with each other is arranged on a line perpendicular to the bore center axis 120 of each cylinder. A driven pulley 140 is attached to the end portion of a driving shaft 138a of the series auxiliary unit 138. A driving pulley 142 is attached to the end portion, opposite to the end portion attached with the clutch 128, of the crankshaft 118, and a belt 144 is looped between the driving pulley 142 and the driven pulley 140. The series auxiliary unit 138 is driven and operated by the two pulleys 140 and 142 and the belt 144 upon rotation of the crankshaft 118.

An air cleaner 146 is mounted in front of the upper side of the engine 116. Fresh air filtered through the air cleaner 146 is supplied to a serge tank 148 arranged on substantially the extending line of the bore center axis 120 of each cylinder of the engine 116 through an intake pipe (not shown). One end portion of an intake manifold 150 for supplying fresh air to the cylinders of the engine 116 is connected to the serge tank 148, and the other end portion of the intake manifold 150 is connected to the front-side portion of the cylinder head 116a of the engine 116. Fresh air supplied from the air cleaner 146 to the serge tank 148 is supplied to the cylinder head 116a through the intake manifold 150. With this arrangement, the intake manifold 150 is assured with a sufficient length between the serge tank 148 and the cylinder head 116a so as to attain inertial aspiration, as shown in FIG. 4.

An exhaust manifold 152 is connected to the rear-side portion of the cylinder head 116a, and an exhaust pipe 154 connected to the exhaust manifold 152 extends to the rear portion of the vehicle body. In the second embodiment, exhaust efficiency can be improved since the exhaust manifold 152 and the exhaust pipe 154 can linearly extend from the cylinder head 116a in association with the position of the engine 116.

A rack-and-pinion type steering gear box 156 is arranged behind the front differential device 136.

Figures 5, 6:
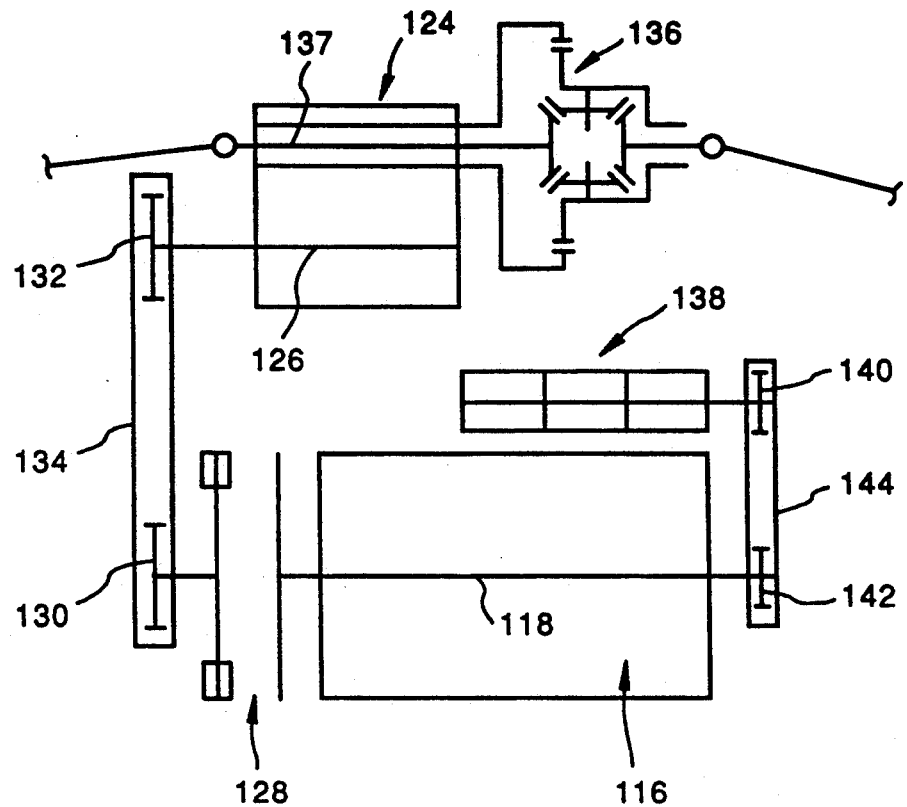
FIG. 5 is a plan view showing the vehicle power train structure of the second embodiment.
FIG. 6 is a table showing changes in dimensions of a vehicle body adopting the vehicle power train structure of the second embodiment with respect to a base vehicle body.

FIG. 5 is a plan view illustrating the arrangement of the power train of the second embodiment.

As described above, the output shaft 130 is attached to one end portion of the crankshaft 118 of the engine 116 through the clutch 128. The transmission 124 is mounted at a position neighboring the engine 116. The silent chain 134 is looped between the input gear 132 of the transmission 124 and the output gear 130, and the rotating force of the engine 116 is transmitted to the transmission 124. The rotating force of the engine 116 transmitted to the transmission 124 is transmitted to the front drive shaft 137 through the front differential device 136, and is then transmitted to the right and left front wheels 122.

The belt 144 is looped between the driving pulley 142 attached to the opposing end portion of the crankshaft 118 and the driven pulley 140 of the series auxiliary unit 138, and the series auxiliary unit 138 is driven upon rotation of the crankshaft 118.

FIG. 6 is a table showing changes in dimensions of the respective portions of the vehicle body when the power train structure of the second embodiment is applied to a base vehicle with a cylinder head facing up.

As shown in FIG. 6, although the front overhung (FOH) remains the same, the wheel base (WB) can be shortened by 85 mm as compared to the base vehicle, and hence, the total length can also be shortened by 85 mm. Therefore, the vehicle can be rendered compact as compared to the base vehicle while mounting an engine having equivalent performance. Since the total height of the power train can be decreased, the engine hood line can be lowered.

Upon comparison of the second embodiment with the first embodiment, since the first embodiment adopts the front-midship mount wherein the engine 16 is mounted behind the front wheels 22, the front overhung can be largely shortened, and the total length can also be remarkably shortened. In contrast to this, in the second embodiment, since the engine 116 is arranged in front of the front wheels, the wheel base can be remarkably shortened although the front overhung remains the same. In addition, the total length of the vehicle body 108 can be shortened although it is larger than that in the first embodiment. In either embodiment, a compact vehicle can be realized as compared to the base vehicle.

Figure 7:
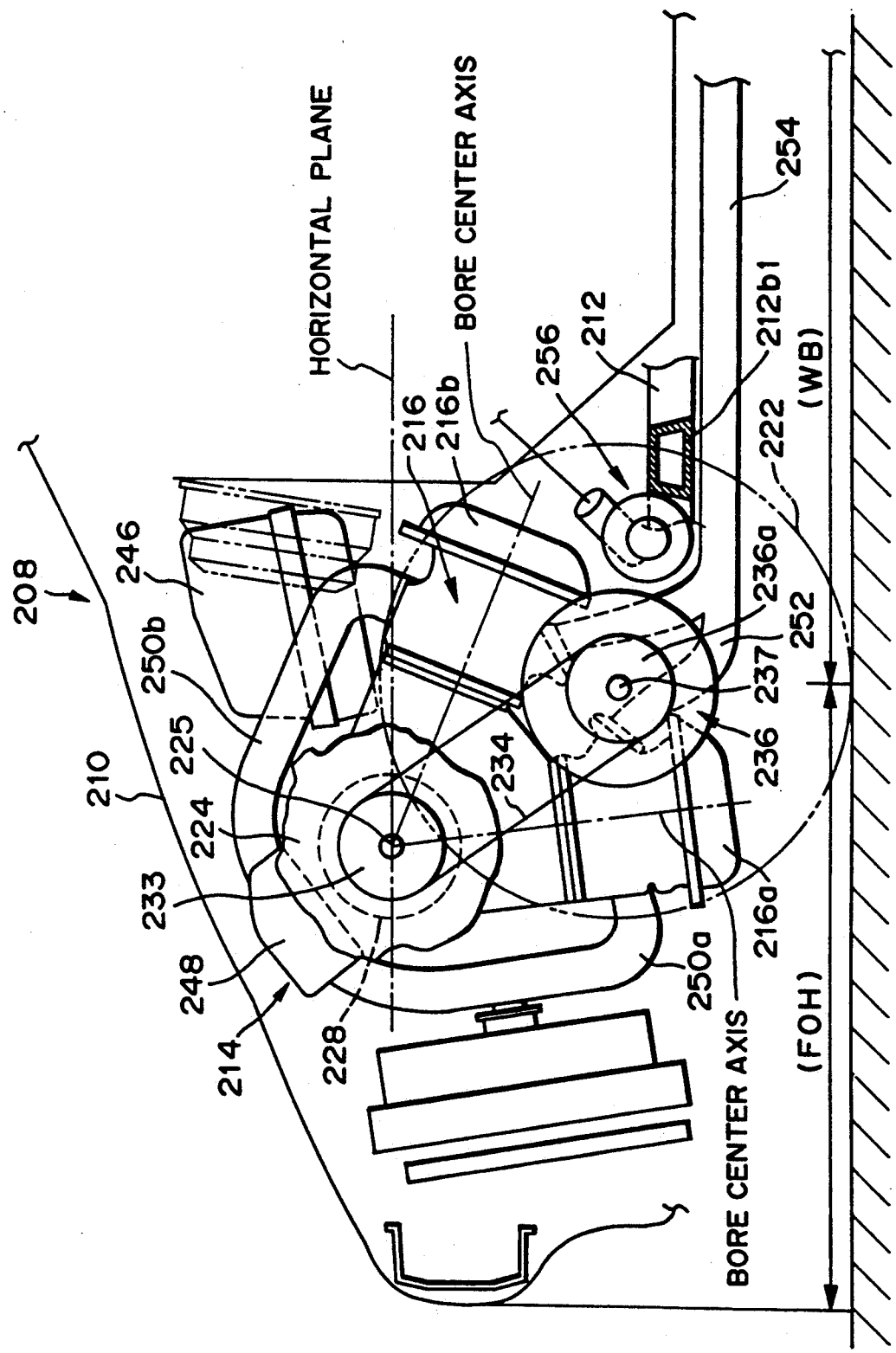
FIG. 7 is a side sectional view showing a vehicle power train structure according to the third embodiment of the present invention.

FIG. 7 is a side sectional view showing a structure according to the third embodiment.

Referring to FIG. 7, a body 210 constituting an upper portion of a vehicle body 208 is supported by a ladder frame 212 constituting a lower portion of the vehicle body 208 as in the first and second embodiments, and a power train 214 is supported on a cross member 212b1, located at the most front side of the vehicle body, of the frame 212.

The arrangement of the respective portions of the power train 214 will be described below.

An engine 216 is a V-type six-cylinder engine. As shown in FIG. 7, the engine 216 is mounted on the frame 212 with a cylinder head 216a for three cylinders facing down in a substantially vertical direction, and a cylinder head 216b for another three cylinders facing obliquely backward. A banking angle between the cylinder head 216a for the three cylinders and the cylinder head 216b for another three cylinders, which are arranged in the V shape is about 60°.

A transmission 224 is connected to one end portion of a crankshaft 218 of the engine 216 through a clutch 228. A bevel gear type front differential device 236 is mounted on a line passing the center of rotation of the crankshaft 218, and located at substantially the center of the V-shaped banking angle, so that the center of its rotating shaft is located on the line. More specifically, the front differential device 236 is arranged at a middle position between the cylinder heads 216a and 216b of the cylinders arranged in the V shape. An output gear 233 is attached coaxially with an output shaft 225 of the transmission 224. A silent chain 234 is looped between an input gear 236a formed on the outer circumferential surface of a differential case of the front differential device 236 and the output gear 233 of the transmission 224, and the rotating force of the crankshaft 218 is transmitted to the front differential device 236. The front differential device 236 transmits the rotating force transmitted from the transmission 224 to a front drive shaft 237, and the rotating force is then transmitted to right and left front wheels 222.

An air cleaner 246 is mounted behind the upper portion of the engine 216, and fresh air filtered through the air cleaner 246 is supplied to a surge tank 248 arranged obliquely above the front side of the engine 216 through an intake pipe (not shown). One-end portions of intake manifolds 250a and 250b for supplying fresh air to the cylinders of the engine are connected to the surge tank 248, and other end portions of the intake manifolds 250a and 250b are connected to the outer portions of the cylinder heads 216a and 216b of the V-type engine 216. Fresh air supplied from the air cleaner 246 to the tank 248 is supplied to the cylinder heads 216a and 216b through the intake manifolds 250a and 250b. With this arrangement, the intake manifolds 250a and 250b are assured with a sufficient length between the surge tank 248 and the cylinder heads 216a and 216b so as to attain inertial aspiration, as shown in FIG. 7.

An exhaust manifold 252 is connected to the inner portions of the cylinder heads 216a and 216b of the V-type engine, and an exhaust pipe 254 connected to the exhaust manifold 252 extends to the rear portion of the vehicle body 208.

A so-called rack-and-pinion type steering gear box 256 is mounted behind the front differential device 236.

Figures 8, 9:
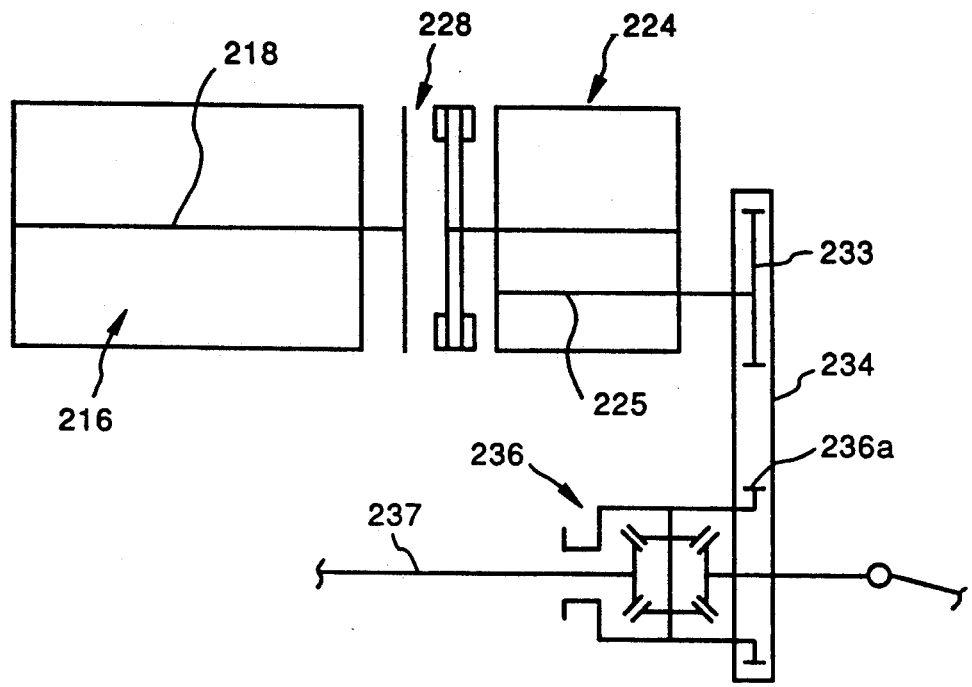
FIG. 8 is a plan view showing the vehicle power train structure of the third embodiment.
FIG. 9 is a table showing changes in dimensions of a vehicle body adopting the vehicle power train structure of the third embodiment with respect to a base vehicle body.

FIG. 8 is a plan view illustrating the arrangement of the power train 214 of the third embodiment.

As described above, the transmission 224 is connected to one end portion of the crankshaft 218 of the engine 216 through the clutch 228. The front differential device 236 is arranged at a position neighboring the transmission 224. The silent chain 234 is looped between the input gear 236a formed on the outer circumferential surface of the differential case of the front differential device 236 and the output gear 233 of the transmission 224. The rotating force of the engine 216 is transmitted to the front drive shaft 237 through the front differential device 236, and is then transmitted to the right and left front wheels 222.

FIG. 9 is a table showing changes in dimensions of the respective portions of the vehicle body when the power train structure of the third embodiment is applied to a base vehicle with a cylinder head facing up.

As shown in FIG. 9, although the wheel base (WB) remains the same, the front overhung (FOH) is shortened by 115 mm as compared to the base vehicle, and the total length can also be shortened by 115 mm Therefore, the vehicle can be rendered compact as compared to the base vehicle while mounting an engine having equivalent performance. Since the total height of the power train 214 can be decreased, the engine hood line can be lowered.

Upon comparison of the third embodiment with the first and second embodiments, since the first embodiment adopts the front-midship mount wherein the engine 16 is mounted behind the front wheels 22, the front overhung can be largely shortened, and the total length can also be remarkably shortened. However, in the first embodiment, the wheel base tends to increase. In the second embodiment, since the engine is mounted in front of the front wheels, the wheel base can be remarkably shortened although the front overhung cannot be shortened. In addition, the total length of the vehicle body 108 can be shortened although it is larger than that in the first embodiment. In contrast to this, the third embodiment is suitable for a case wherein the front overhung and the total length are to be shortened without increasing the wheel base like in the first embodiment. In any of the above embodiments, a compact vehicle can be realized as compared to the base vehicle.

As described above, according to the first to third embodiments, since the engine is mounted with the bore center axis of the cylinder inclining downwardly towards the cylinder head with respect to horizontal plane of the vehicle, the vehicle can be rendered compact. The present invention is not limited to the above embodiments and various changes and modifications can be made within the spirit and scope of the present invention. Therefore, to apprise the public of the scope of the present invention the following claims are made.

What is claimed is:

1. A vehicle power train structure comprising:
   an engine which has a plurality of cylinders and is mounted in a vehicle body with a bore center axis of each of said cylinders inclining downwardly towards a corresponding cylinder head of each of said cylinder with respect to a horizontal plane of the vehicle;
   a crankshaft which functions as an output shaft extending in a widthwise direction of said vehicle body, said cylinder head being located below a horizontal plane extending through said crankshaft;
   a transmission having a shaft which is arranged at a position neighboring said engine to be substantially parallel to an extending direction of said crankshaft, for receiving a rotating force of said engine; and
   a drive shaft arranged below said transmission, said drive shaft extending in a widthwise direction of said vehicle body, for receiving the rotating force of said engine from said transmission.

2. The power train structure according to claim 1, wherein said engine is mounted on a frame having two side members extending in a back-and-forth direction of said vehicle body, and a plurality of cross members extending between said two side members, and
   the cross member located at a forwardmost position of said vehicle body, is arranged below said transmission.

3. The power train structure according to claim 2, wherein said engine is arranged on said frame so as to be slanted toward a side where said transmission is mounted to have a side of said cylinder head as a fulcrum.

4. The power train structure according to claim 3, wherein said transmission is arranged at a front side of said engine of said vehicle body, and a serge tank connected to an intake manifold for supplying air to said engine is arranged above said transmission.

5. The power train structure according to claim 3, wherein said transmission is arranged at a front side of said engine of said vehicle body, and a steering gear box for steering front wheels is arranged behind said engine.

6. The power train structure according to claim 3, wherein said transmission is arranged at a rear side of said engine of said vehicle body, and an exhaust pipe connected to a rear-side portion of said cylinder head extends to a rear portion of said vehicle body via a portion below said transmission.

7. The power train structure according to claim 1, wherein said plurality of cylinders are arranged in a V shape, said structure further comprising:
   a plurality of exhaust mainfolds respectively connected to said plurality of cylinder heads to extend inside a banking angle of the V shape;
   a plurality of intake manifolds respectively connected to said plurality of cylinder heads to extend outside the banking angle of the V shape; and
   a collecting portion of said intake manifolds, arranged above said engine.

8. The power train structure according to claim 1, wherein said plurality of cylinders are arranged in a V shape, said structure further comprising:
   a drive shaft, arranged at a middle position between a banking angle of the V shape, and coupled to front wheels.

* * * * *